Patented May 29, 1951

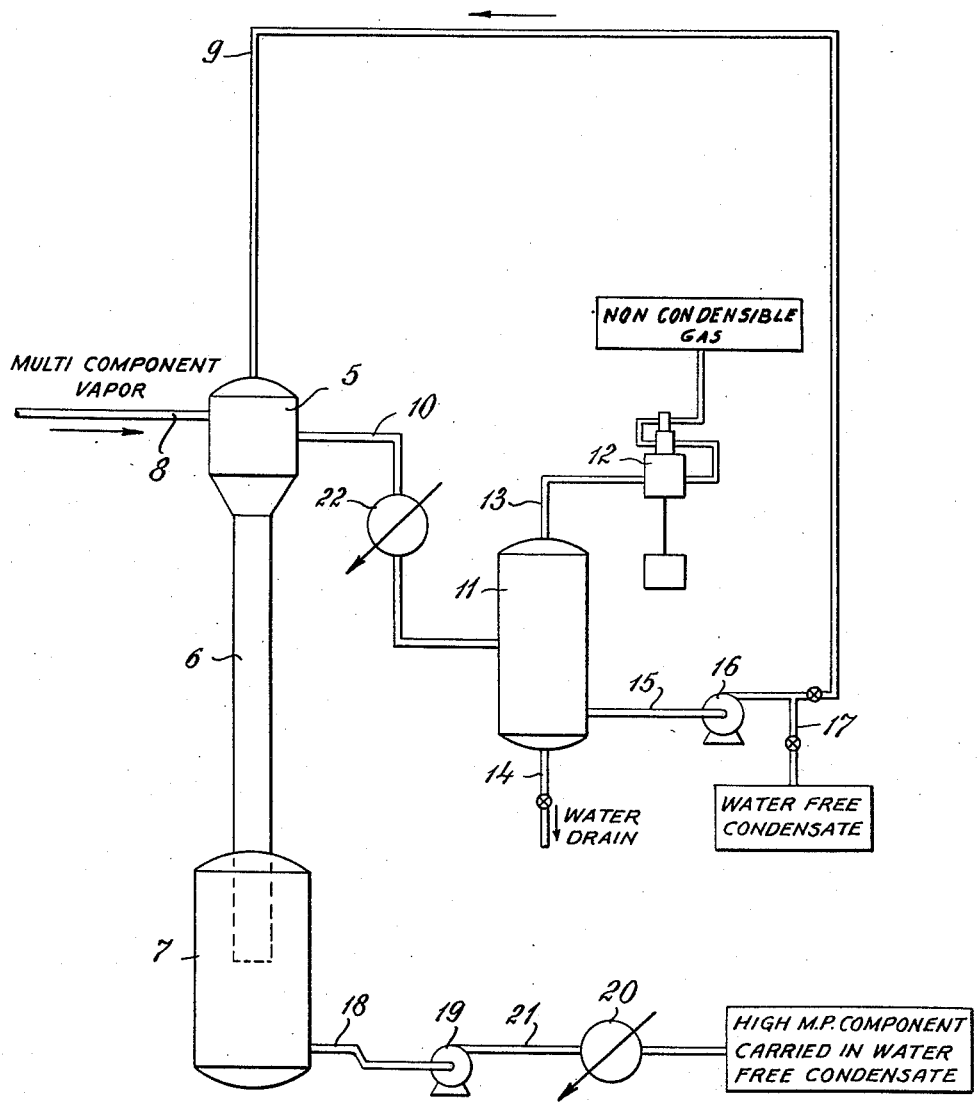

2,555,287

UNITED STATES PATENT OFFICE 2,555,287

METHOD FOR CONDENSING VAPORS

Stuart T. Hadden, Woodbury, N. J., assignor to Socony-Vacuum Oil Company, Incorporated, a corporation of New York Application October 3, 1944, Serial No. 557,019

3 Claims. (Cl. 183—120)

This invention relates to a method for condensing multi-component vapors and is particularly directed to a method for condensing multi-component vapors containing at least one component which solidifies above the condensation point of the remaining vapors or above the normal condensation temperature. Such vapors may also contain components which are condensible at normal temperatures and to some extent immiscible in the liquid phase and other components which are not condensible at normal temperatures. Such vapors are encountered in processes for handling and treating wax or petrolatum containing hydrocarbons such as certain petroleum crudes and also in certain chemical manufacture processes.

There are two general classes of vapor condensers, namely, surface condensers, and jet condensers. Surface condensers involve the removal of heat from the vapors by indirect transfer through cooling tubes between the vapors and a cooling fluid, usually water. Jet condensers involve the direct mixture of water with the vapors to accomplish the condensation. When vapors containing one or more components which freeze or solidify above the condensation point of the remaining vapors are condensed in surface condensers, the condenser tubes rapidly become coated and finally plug with the high freezing point component, after which operation must be discontinued. On the other hand, where such vapors are condensed by contact with water in a jet condenser, the resulting condensate may be contaminated by the water either in solution or in suspension. Moreover, since water used for such purposes generally contains various quantities of sediment and of dissolved chemicals, these also contaminate the condensate.

A major object of this invention is the provision of a method for condensation of vapors containing at least one component which solidifies above the desired condensate temperature or above the condensation point of the remaining vapor which method overcomes the above difficulties.

A specific object of the invention is the provision of a practical method for condensation of a vapor containing mainly benzene or benzene homologs and phthalic anhydride or homologs thereof.

Another specific object of this invention is the provision of a practical method for condensation of hydrocarbon vapors containing waxy components without contamination thereof. These and other objects will appear from the following discussion.

In order to more readily understand the invention, reference should be made to the attached drawing, which is a diagrammatic sketch showing a flow plan according to the method proposed. In the attached drawing, 5 is a jet condenser having the vertical leg 6 and the sump or receiver 7 at its lower end. The head of the jet condenser is provided with a mixed vapor inlet conduit 8, a cooling liquid inlet conduit 9 and a vapor outlet conduit 10. A cooler 22 is provided in the vapor outlet conduit 10 between the head section of the jet condenser and a receiving vessel 11. The receiving vessel 11 may be simply a large vertical separating tank as shown, or it may be a fractionating column. A compressor 12 is provided on non-condensible gas outlet 13 from the upper end of the vessel 11. A water drain 14 is provided upon the lower end of the vessel 11 and an outlet conduit 15 for condensate withdrawal near the lower end thereof. The outlet conduit 15 connects into a pump 16 which may pump all or part of the condensate back to the jet condenser through conduit 9 or part of the condensate to an external receiver through conduit 17. The sump 7 at the lower end of the jet condenser leg is provided with an outlet conduit 18 which connects into a pump 19 for liquid withdrawal.

The arrangement shown may be used for the condensation of numerous multi-component vapor mixtures which contain at least one constituent which solidifies above the condensation temperature of the remaining constituents or above the normal condensation temperature, i. e., of the intended final condensate. Such vapors may also contain non-condensible gases and/or water vapor as well as normally condensible constituents. In operation the mixed vapor passes from the external system in which it was formed (not shown) through conduit 8 into the head section of the jet condenser 5 wherein it is intimately contacted with a cooling liquid entering through conduit 9. The cooling liquid may be simply heated or partially evaporated depending on conditions and part of the original vapor will be condensed. The proper proportion of vapor to cooling liquid so contacted is, of course, dependent upon the temperature of the cooling liquid and the vapor streams, the sensible heat of the cooling liquid and vapor and the latent heat of the material condensed. In any case the proportion is so adjusted as to condense substantially all of the vapor component having the high solidification temperature and to condense such quantity of the normally condensible component or components of the vapor as will together with the unevaporated liquid satisfactorily carry the component having the high solidification temperature. By the term "as will satisfactorily carry" or equivalents thereof, as used in describing or claiming this invention, is meant as will permit satisfactory transfer of said component having the high solidification temperature along with the combined unevaporated cooling liquid and the part of the condensibles condensed through conventional pumps and conduits either as a suspension or slurry or as a solution or as a combination thereof. If water is one of the condensible components of the original vapor, it may be desirable to further control the proportion of vapor to cooling liquid charge so as to substantially prevent water condensation in the jet condenser. The condensed material and unevaporated cooling liquid pass downwardly through the jet condenser leg 6 into the sump 7 from which it is withdrawn through conduit 18 and pump 19. The condensed material may then be passed through conduit 21 and surface condenser 20 for further cooling, if desired, and then to storage or to some external system. Since the component having the high solidification or freezing temperature has been previously condensed in the jet condenser and is carried either in solution or in suspension, it may be further cooled in a surface type condenser 20 without danger of plugging said condenser. In this connection, it should be remembered, however, that if said component is being carried in solution, and the solution is to be further cooled, sufficient condensibles (solvent) should be condensed in the jet condenser to carry the solute in solution also at the intended low temperature in order to avoid precipitation of some of the solid material during the further cooling. It should also be noted that where the condensed material drained from sump 7 is a substantial part slurry and a substantial part solution of the high freezing point constituent, any further cooling should be conducted in another jet condenser. That part of the original mixed vapor which has not been condensed in the jet condenser passes therefrom through conduit 10 and passes through condenser 22 wherein the condensible portion is condensed. The condenser 22 may be of the ordinary surface type since the component having the high freezing point has been previously removed. The condensate and non-condensibles then pass into the vessel 11 for separation. The vessel 11 may be a simple separation tank in which case it is maintained only partly filled with liquid and the non-condensibles are withdrawn from the upper end thereof through conduit 13 and compressor 12 from which they pass to an external system. It should be understood that the term "non-condensibles" as used in describing and claiming this invention is intended to cover any vapor components which are not condensed under the temperature and pressure existing in condenser 22 or vessel 11. Water if present and immiscible with the condensibles may be drawn from the bottom of the separator and the condensate may be withdrawn through conduit 15 within the lower section of the separator. Obviously if the condensate is of higher specific gravity than the water, the positions of the respective drawoffs may be interchanged. The vessel 11 may be a fractionation column, if desired, to provide more efficient separation between condensible and non-condensible components. The required amount of condensate is pumped from vessel 11 by means of pump 16 through conduit 9 to the head section of the jet condenser wherein it serves as the hereinbefore mentioned cooling liquid. The excess condensate, if any, is withdrawn from the conduit 17 to an external system or to storage or it may be combined with the condensed material withdrawn from the jet condenser.

It is not claimed herein that the use of a jet condenser for condensing vapors is new or novel, but novelty is claimed in the method of this invention wherein vapors of the type hereinbefore described are condensed by intimate contact with a cooling liquid which is of substantially the same composition of one or more of the normally condensible components of the original vapor other than the component or components having the high freezing point. By this method, contamination of the condensed material by an external cooling liquid is avoided. The high liquid velocities and the relatively large size of the passage for liquid flow within the jet condenser prevent the plugging of the apparatus by the condensed vapor component having a high freezing point. Moreover, as has been shown, moisture, if present, may be separated from the high freezing point component before its condensation to liquid water. This is of considerable importance in many processes wherein simultaneous condensation of water and of the heavier vapor components, such as heavy hydrocarbons, result in emulsions, some of which may be very difficult to break. Also in other cases the condensed water may react with one of the components in the liquid phase, which reaction may be undesirable. Such an instance will be shown in the example of an application of this invention which follows hereinafter.

It will be apparent to those skilled in the art that apparatus differing from the ordinary jet condensers may be used for carrying out the method of this invention provided such other apparatus provides for intimate contact of the vapors and cooling liquid and for proper separation and withdrawal of the resulting condensate and uncondensed vapors.

Typical of the vapors which may be successfully and continuously condensed and recovered by the method of this invention is a vapor encountered in a certain chemical process, disclosed in U. S. Patent No. 2,401,225, which vapor consists essentially of about 92 parts by weight benzene and 8 parts by weight phthalic anhydrides and small fractions of water and non-condensibles such as CO and $CO_2$. It is desirable to condense this stream and recycle the phthalic anhydride and benzene to the chemical process. Inasmuch as the boiling point of benzene at atmospheric pressure is about 176° F. and the freezing point of phthalic anhydride is about 269° F., the condensation of such vapor in ordinary surface condensers is not feasible. According to the method of this invention the vapor at about 300° F. is introduced into a jet condenser in a continuous stream and contacted therein with liquid benzene introduced continuously to the jet condenser at about 100° F. The quantity of vapor and liquid so introduced is proportioned so that substantially all the phthalic anhydride is condensed and withdrawn partly as a solution and partly as a slurry in liquid benzene in the ratio 4 parts by weight benzene to 1 parts of phthalic anhydride. The jet condenser is operated under about 5#/in.² pressure absolute as regulated by pressure requirements of the external chemical process involved. The resulting condensate is removed at about 124° F. and may be pumped back to the chemical process. Benzene vapor carrying water in the vapor state, CO and $CO_2$ is also withdrawn from the jet condenser and separately condensed. The CO, $CO_2$ and water were then separated from the benzene and part of the benzene liquid was used as the cooling liquid to the jet condenser. In this particular operation, it was also highly desirable to separate the water content of the original vapor from the phthalic anhydride before condensation in order to prevent hydrolysis of the condensed phthalic anhydride by liquid water.

It should be understood that the description of the apparatus used for this invention and the specific examples of the application of the method of this invention are intended as exemplary and are in no way meant to limit the scope of the invention except as it may be limited in the following claims.

I claim:

1. Wherein a mixture of vapors contain one component which solidifies above the desired condensate temperature of the remaining vapors, and said vapors have entrained therein a small fraction of water vapor, the method of condensing said vapors free of said water vapor which comprises the following steps: introducing said vapors into a condensing zone, introducing a spray of cooling liquid into said zone, the proportion of cooling liquid to vapors and the temperature of the cooling liquid being controlled to condense all of said high solidifying point material and to provide sufficient liquid to carry said material as a slurry, withdrawing said slurry from said zone at a rate sufficient to prevent flooding of said zone, the proportion and temperature being further controlled to prevent the condensation of any substantial amount of water vapor without requiring the presence of any inert gas, withdrawing the remaining vapor to a separate condensing zone, condensing the remaining vapors, separating the water from the remaining liquid and returning at least a portion of the remaining liquid to the first condensing zone to provide all the cooling liquid.

2. Wherein a mixture of vapors contain one component which solidifies above the desired condensate temperature of the remaining vapors, and said vapors have entrained therein a small fraction of water vapor, the method of condensing said vapors free of said water vapor which comprises the following steps: introducing said vapors into a condensing zone, introducing a spray of cooling liquid into said zone, the proportion of cooling liquid to vapors and the temperature of the cooling liquid being controlled to condense all of said high solidifying point material and to provide sufficient liquid to carry said material as a solution, withdrawing said solution from said zone at a rate sufficient to prevent flooding of said zone, the proportion and temperature being further controlled to prevent the condensation of any substantial amount of water vapor without requiring the presence of any inert gas, withdrawing the remaining vapor to a separate condensing zone, condensing the remaining vapors, separating the water from the remaining liquid and returning at least a portion of the remaining liquid to the first condensing zone to provide all the cooling liquid.

3. In a chemical process in which a side stream of vapors, consisting mainly of a benzene and phthalic anhydride mixture and including small fractions of water vapor and non-condensibles, the method of condensing said vapors free of said water vapor and non-condensibles which comprises the following steps: introducing said vapors into a jet condenser, introducing a spray of liquid benzene into said condenser, the proportion of liquid benzene to vapor and the temperature of the benzene being controlled to condense substantially all the phthalic anhydride and to provide sufficient benzene to carry said phthalic anhydride as a slurry, the proportion and temperature being further controlled to prevent the condensation of any substantial amount of water vapor without requiring the presence of any minimum amount of inert gas, withdrawing the slurry at a rate sufficient to prevent flooding said jet condenser, returning said slurry to the chemical process, withdrawing the remaining vapors to a separate condenser, condensing the benzene and water, separating the non-condensibles and water from the benzene, and returning at least part of the liquid benzene to the jet condenser to provide all the cooling liquid.

STUART T. HADDEN.

REFERENCES CITED

The following references are of record in the file of this patent:

UNITED STATES PATENTS

| Number | Name | Date |
|---|---|---|
| 1,808,087 | Urquhart | June 2, 1931 |
| 2,140,140 | Punnett | Dec. 13, 1938 |
| 2,245,358 | Pechukas | June 10, 1941 |
| 2,308,588 | Crowell | Jan. 19, 1943 |
| 2,311,466 | Pechukas | Feb. 16, 1943 |
| 2,401,225 | Caesar | May 28, 1946 |

FOREIGN PATENTS

| Number | Country | Date |
|---|---|---|
| 415,748 | Great Britain | Aug. 27, 1934 |